Jan. 7, 1941.  E. E. MILLER  2,228,175
CULINARY APPLIANCE
Filed March 31, 1939   2 Sheets-Sheet 1
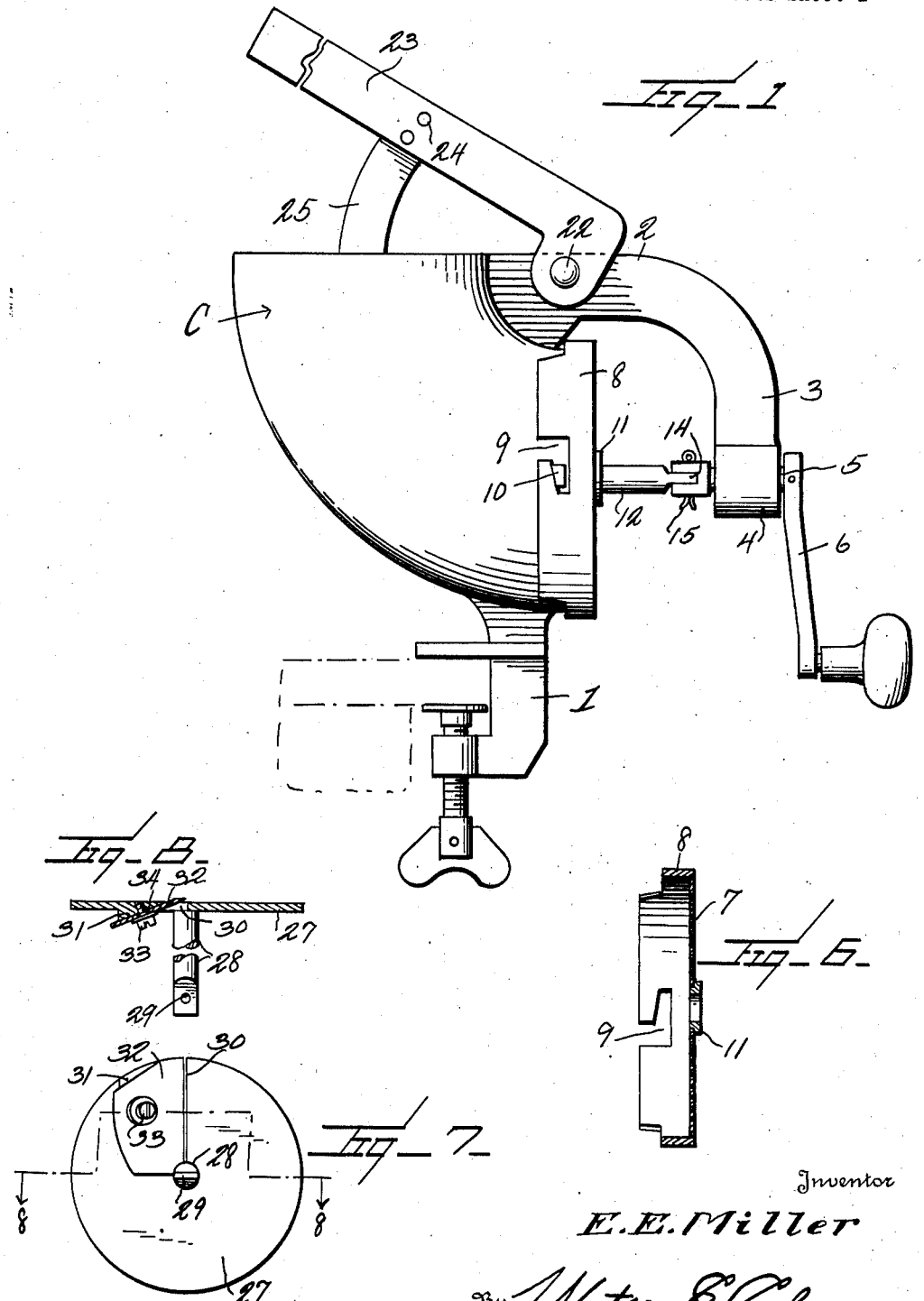
Inventor
E. E. Miller
By Watson E. Coleman
Attorney

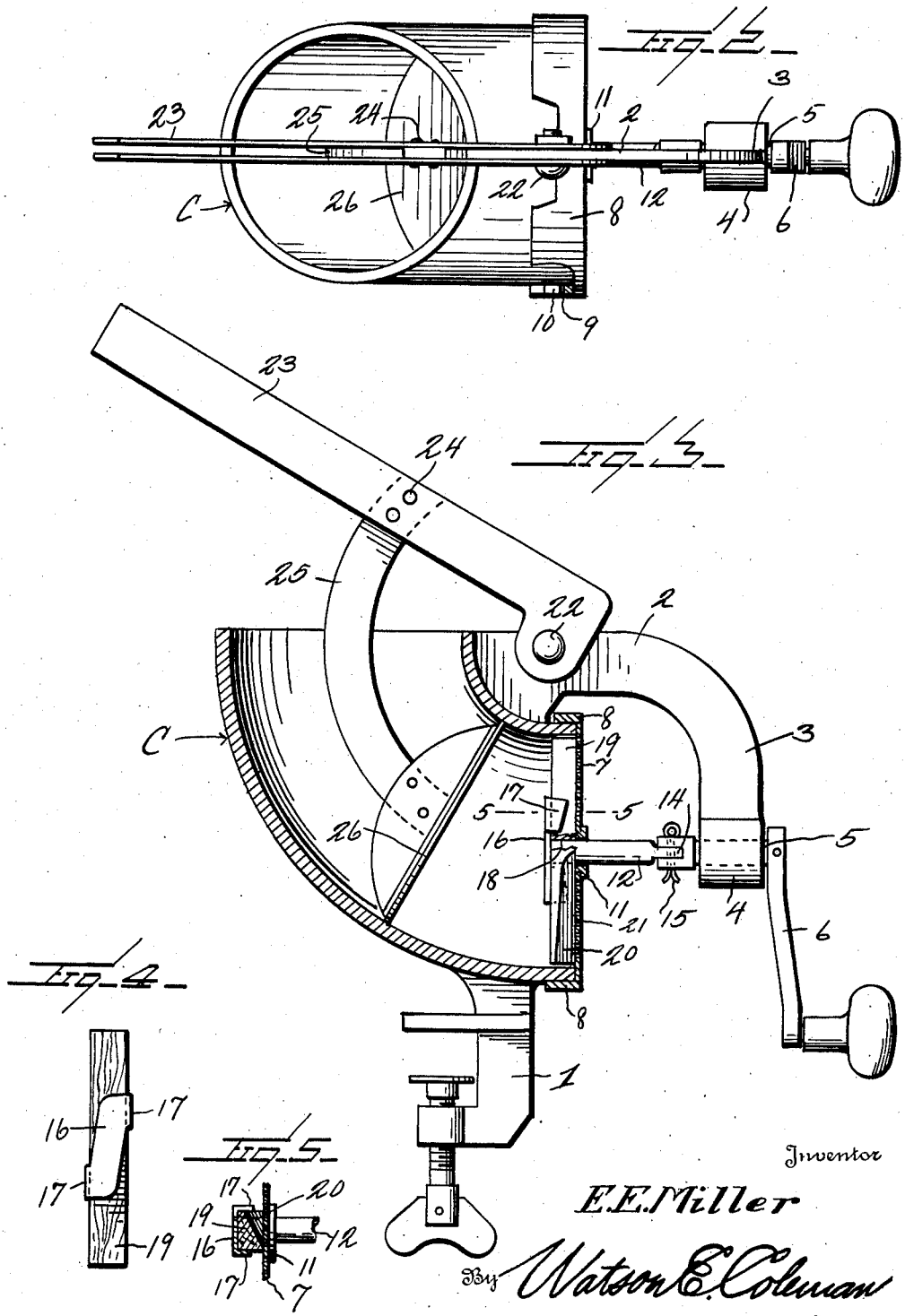

Patented Jan. 7, 1941

2,228,175

UNITED STATES PATENT OFFICE 2,228,175

CULINARY APPLIANCE

Elmer E. Miller, Millersburg, Pa.

Application March 31, 1939, Serial No. 265,330

3 Claims. (Cl. 146—115)

This invention relates to a culinary appliance, and it is an object of the invention to provide an appliance which can be employed to advantage in the slicing and mashing of vegetables and fruit and also to be employed in the straining of the pulp of the vegetables or fruit when so desired.

It is also an object of the invention to provide a device of this kind which can be employed with facility in the thinning out of cottage cheese, apple butter and kindred food products.

A more particular object of the invention is to provide a device of this kind comprising a receptacle having a pressing member associated therewith together with means for supporting a rotatable member in proper position to effect the desired use of the appliance and wherein one implement or adjunct may be readily substituted for another in accordance with the character of the work to be performed.

The invention consists in the details of construction and in the combination and arrangement of the several parts of my improved culinary appliance whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a culinary appliance constructed in accordance with an embodiment of my invention;

Figure 2 is a view in top plan with a portion broken away of the appliance as illustrated in Figure 1;

Figure 3 is a view partly in vertical section and partly in elevation of the appliance as illustrated in Figures 1 and 2;

Figure 4 is a detailed view in elevation illustrating the mounting for the impeller as herein embodied;

Figure 5 is a sectional view taken substantially on the line 5—5 of Figure 3;

Figure 6 is a sectional view taken radially thru the perforated member used in mashing and straining;

Figure 7 is a view in elevation of a slicing member to be used in connection with my improved appliance;

Figure 8 is a sectional view taken substantially on the line 8—8 of Figure 7.

As illustrated in the accompanying drawings, C denotes an arcuate container open at both ends and of desired radius. This container C, as herein embodied, constitutes substantially one-fourth of a circle so that when in use one end of the container C will be upwardly disposed and the opposite or lower end forwardly disposed. The lower portion of the container C carries a depending clamping means indicated generally at 1 whereby the appliance may be effectively held in position upon the marginal portion of a table, shelf or otherwise as may be desired. At this time I wish to state that I do not care to be understood as limiting myself to any particular type of clamping means or to any special means whereby the container C may be maintained in desired working position.

Welded or otherwise rigidly secured to the wall of the container C at a point above the lower open end of the container C is an end portion of an outwardly or forwardly directed arm 2. This arm 2 is in radial alignment with the axial center of the lower open end of the container C and has its outer end portion continued by an angularly disposed bracket arm 3 terminating in a bearing 4, the bore of which is axially aligned with the axial center of the lower or discharge end of the container C. Rotatably disposed through the bearing 4 is a shaft 5, the outer end portion of which is herein shown as having attached thereto an operating crank 6. I wish to state at this time that means other than the crank 6 may be used for rotating the shaft 5 as desired.

As illustrated in Figures 1, 2 and 3 of the accompanying drawings, the lower or discharge end portion of the container C has disposed thereover a perforated plate 7. This plate 7 is preferably of metal and has its peripheral portion soldered or otherwise rigidly secured to a rim member 8. This rim member 8 is of a type to readily slip upon the lower end portion of the container C and is provided at desired points therearound with the bayonet slots 9 each of which coacts with an outstanding web lug 10 extending outwardly from the discharge end portion of the container C. Through the medium of the slots 9 and webs 10 the rim member 8 may be readily applied to or removed from the container C.

The plate 7 at its axial center has secured thereto a bushing 11 through which is adapted to be snugly but freely inserted a shank 12. The outer end portion of the shank 12 is formed to interlock, as at 14, with the adjacent or inner end of the shaft 5 whereby the shaft 5 and shank 12 will rotate in unison and in the same direction. The shank 12 is coupled to the shaft 5 by the removable member 15 preferably a cotter pin.

The inner end portion of the shank 12 carries a flat cross member 16 and this member 16 at the extremities thereof and at opposite sides is provided with inwardly disposed lips or flanges 17, there being one of said lips or flanges 17 at each extremity. The shank 12 before being inserted through the bushing 11 is passed through a central opening 18 at the center of an impeller 19. This impeller 19 is preferably of wood and is of such dimensions as may be required.

When the impeller 19 is applied upon the shank 12 said impeller will be disposed lengthwise of the head 16 with the lips or flanges 17 overlying opposite side faces of the impeller and having such coaction with the impeller 19 to cause the same to rotate with the shank 12 as the shaft 5 is rotated. It has been found in practice that this particular mounting of the impeller 19 is of importance as by the use of screws or nails to hold the impeller 19 to the head 16 there is always the liability of the impeller 19 splitting. The impeller 19 is provided longitudinally therealong at each side of its center from a point closely adjacent to the opening 18 to the outer end theerof with a beveled face 20. The beveled face 20 at one end portion of the impeller 19 is at one side thereof while the beveled face at the opposite end portion of the impeller 19 is along the opposite side thereof. It is also to be stated that the beveled faces 20 are disposed along the sides of the impeller 19 substantially at right angles to a flat face 21 which has direct contact with the inner surface of the applied perforated plate 7.

The beveled faces 20 are so arranged one with respect to the other that as the impeller 19 rotates with the shank 12 said beveled faces 20 will act upon the potatoes or other vegetables or tomatoes or fruit within the container C to force such substances out through the openings of the perforated plate 7. In connection with potatoes and kindred vegetables this results in an effective mashing and when used with tomatoes or the like an effective separation or straining of the seeds from the pulp is accomplished. It is to be understood that when the device is used as just mentioned the fruits or vegetables have been previously softened to the desired consistency as by boiling or steaming.

To assure the desired effective action of the impeller 19 it is important and necessary that pressure be imposed upon the substances within the container C to force the same against the plate 7.

Pivotally connected, as at 22, to the arm 2 and at the center about which the arcuate container C is disposed is an end portion of a lever 23. This lever 23 is of desired length and extends across or above the upper end of the container C. Rigidly connected, as at 24, to this lever 23 is a rigid arcuate arm 25 of desired length and which is disposed about the same center as the container C, or more particularly the interior of the container. This arm 25 extends within the container C at the axial center thereof and is also in the form of substantially one-quarter of a circle. The extremity of the arm 25 which enters the container C has rigidly secured thereto a flat head 26 which snugly engages and travels within the container C so that as pressure is imposed upon the lever 23 such pressure will be transmitted through the head 26 to the vegetables or fruits or other substances within the container in advance of the head 26 to force the same out through the perforations of the plate 7.

While I have particularly referred to the appliance as being used in connection with vegetables and fruits it is to be stated that it can be employed with equal facility in the grinding of cottage cheese, apple butter and kindred food products.

It is to be noted that the mounting of the plate 7 and the shank 12 is such as to permit the same to be readily applied and removed. This is of importance as it is the purpose of my appliance to substitute one adjunct for another in accordance with the work desired to be performed.

In Figures 6 and 7 I illustrate a slicing adjunct or tool which comprises a plate 27 preferably of metal and of a diameter to snugly fit within the lower end of the container C. This plate 27 at its axial center is provided with an outstanding shank 28. The plate or disk 27 and the shank 28 are rigidly connected and the outer portion of the shank 28 is formed, as at 29, to provide means whereby this shank 28 may interlock with the inner end of the shaft 5 and be coupled thereto by the cotter pin 15 or kindred member hereinbefore referred to.

This plate or disk 27, as herein disclosed, is provided with a radially disposed slot 30 which extends from the shank 28 to the periphery of the disk or plate 27. The outer face of this disk or plate 27 along one side of the slot 30 has its outer face formed to provide an inclined bearing surface 31 against which is adapted to be clamped a slicing blade 32. The blade 32 is held in selected adjusted position upon the surface 31 by the clamping screw 33 which freely passes through a slot 34 in the blade 32 and threads within the disk or plate 27. The slot 34 permits an adjustment of the cutting edge of the blade 32 beyond the plate or disk 27 in accordance with the thickness of the slices desired to be cut.

It is believed to be obvious that with the vegetables or fruit to be sliced placed within the container C and proper pressure imposed thereon under the action of the lever 23, said vegetables or fruit will be readily sliced as the disk or plate 27 rotates with the shaft 5. It is thought to be obvious that the slot 30 is to be of such width as to permit the ready passage therethrough of the slices from the vegetables or fruit.

From the foregoing description it is thought to be obvious that a culinary appliance constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A culinary appliance comprising a container having an arcuate bore open at both ends, a bracket arm carried by the container and terminating in advance of the axial center of one end of said bore, said end of the bore being the discharge end, a shaft rotatably supported by said end portion of the arm and disposed toward the axial center of the discharge end of the bore, a tool mounted within said end portion of the bore of the container, means for coupling said tool to the shaft for rotation therewith, a lever pivotally connected with the arm and extending across the opposite end of the bore, an arcuate arm carried by the lever and extending within the container through said opposite end thereof, a pressure head carried by the end portion of the arcuate arm within the container, and a clamping means carried by the container adjacent to the discharge end of the bore of the container and substantially diametrically opposed to the bracket arm.

2. A culinary appliance comprising a container having an arcuate bore open at both ends, a bracket arm carried by the container and having an end portion terminating in advance of the axial center of one end of said bore, said end of the bore being the discharge, a shaft rotatably supported by said terminal portion of the bracket arm and disposed toward the axial center of the discharge end of the bore, a perforated plate, means for mounting said plate upon the container with said plate disposed over the discharge end, the central portion of said plate having an opening, a shank insertible through said opening of the plate, means for coupling the shank to the shaft, an impeller mounted on the shank for rotation therewith and having contact with the inner face of the applied perforated plate, a pressing element working within the container, and a clamping means carried by the container adjacent to the discharge end of the bore of the container and substantially diametrically opposed to the bracket arm.

3. A culinary appliance comprising a container having an arcuate bore open at both ends, a bracket arm carried by the container and having an end portion terminating in advance of the axial center of one end of said bore, said end of the bore being the discharge, a shaft rotatably carried by said terminal portion of the bracket arm and disposed toward the axial center of the discharge end of the bore, means for rotating the shaft, a plate snugly and rotatably engaging within the discharge end portion of the bore, a shank carried by said plate, means for coupling said shank to the shaft for rotation therewith, cutting means carried by the plate, and a clamping means carried by the container adjacent to the discharge end of the bore of the container and substantially diametrically opposed to the bracket arm.

ELMER E. MILLER.